(12) United States Patent
Stuart et al.

(10) Patent No.: US 8,469,309 B2
(45) Date of Patent: Jun. 25, 2013

(54) MONOLITHIC STRUCTURE FOR MOUNTING AIRCRAFT ENGINE

(75) Inventors: Alan Roy Stuart, Cincinnati, OH (US); Mark Linz, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 808 days.

(21) Appl. No.: 12/343,833

(22) Filed: Dec. 24, 2008

(65) Prior Publication Data

US 2010/0155525 A1    Jun. 24, 2010

(51) Int. Cl.
- B64D 27/26 (2006.01)
- F16M 13/00 (2006.01)
- F02C 7/20 (2006.01)

(52) U.S. Cl.
USPC .............................. 244/54; 248/554; 60/797

(58) Field of Classification Search
USPC ................... 248/554; 60/796, 797; 244/53 R, 244/54, 110 B; 415/126
See application file for complete search history.

(56) References Cited

U.S. PATENT DOCUMENTS

| | | | |
|---|---|---|---|
| 3,071,349 A | | 1/1963 | Glaze |
| 4,326,682 A | * | 4/1982 | Nightingale ............... 244/54 |
| 4,825,648 A | * | 5/1989 | Adamson ................ 60/226.1 |
| 4,989,406 A | * | 2/1991 | Vdoviak et al. ............ 60/762 |
| 5,174,525 A | * | 12/1992 | Schilling ................... 244/54 |
| 5,190,245 A | * | 3/1993 | Debeneix .................. 244/54 |
| 5,284,011 A | * | 2/1994 | Von Benken ............ 60/796 |
| 5,524,847 A | * | 6/1996 | Brodell et al. ............. 244/54 |
| 5,746,391 A | * | 5/1998 | Rodgers et al. ............ 244/54 |
| 6,170,141 B1 | | 1/2001 | Rossway et al. |
| 6,223,524 B1 | * | 5/2001 | Durcan ................... 60/226.1 |
| 6,360,989 B1 | * | 3/2002 | Maguire ................. 244/53 B |
| 6,398,161 B1 | * | 6/2002 | Jule et al. ................. 244/54 |
| 6,401,448 B1 | * | 6/2002 | Manteiga et al. ......... 60/226.1 |
| 7,938,359 B2 | * | 5/2011 | Guibert et al. ............ 244/54 |

(Continued)

FOREIGN PATENT DOCUMENTS

| | | |
|---|---|---|
| DE | 742348 C | 11/1943 |
| EP | 361901 A1 * | 4/1990 |

(Continued)

OTHER PUBLICATIONS

Search Report and Written Opinion from corresponding EP Application No. 09179294.5-2422 dated Dec. 11, 2012.

(Continued)

*Primary Examiner* — Joshua J Michener
*Assistant Examiner* — Elizabeth A Plummer
(74) *Attorney, Agent, or Firm* — McGarry Bair PC

(57) ABSTRACT

Assembly includes an integral monolithic structure for mounting an engine to an aircraft. The monolithic structure includes a nacelle portion and a support structure. The nacelle portion includes an inlet region and a fan case region defining an annular wall about an axial channel. A ring member disposed in the axial channel is connected through a plurality of radial elements to the annular wall. The support structure portion includes a forward section integral with the nacelle portion and an aft section including at least one aircraft mount region for mounting the monolithic structure to an aircraft. The forward section includes an inlet stiffening region radially outward of the annular wall. When mounted on the aircraft, the nacelle portion and the support structure portion cooperate to form a first load path operable to transmit an applied nacelle maneuvering force directly to the aircraft instead of through the engine core.

16 Claims, 8 Drawing Sheets

U.S. PATENT DOCUMENTS

2009/0255271 A1* 10/2009 Vauchel et al. .............. 60/797
2010/0040466 A1* 2/2010 Vauchel et al. .......... 415/213.1
2011/0127369 A1* 6/2011 Dussol et al. ................ 244/54

FOREIGN PATENT DOCUMENTS

| | | |
|---|---|---|
| EP | 1902951 A1 | 3/2008 |
| FR | 2651537 A1 | 3/1991 |
| GB | 273912 A | 7/1927 |
| GB | 2275308 A | 8/1994 |
| GB | 2375513 A | 11/2002 |

OTHER PUBLICATIONS

European Search Report for counterpart EP09179291, Mar. 7, 2013.

* cited by examiner

MONOLITHIC STRUCTURE FOR MOUNTING AIRCRAFT ENGINE

This invention relates generally to aircraft engine assemblies, and more specifically to structures for mounting and encasing aircraft engines.

Large turbofan engines experience a lifting or overturning moment on the inlet during takeoff because of the aircraft angle of attack and the relative air velocity. This force is imparted to the engine structure resulting in backbone bending. Backbone bending results in turbomachinery blade tip to case clearance closure which results in rubs and blade tip wear. In order to minimize blade tip wear due to backbone bending, larger blade to case clearances are incorporated into the aircraft design, resulting in performance loss.

Other performance loss is due to the wing and pylon structure needed to support the mass of the propulsion system that is cantilevered from the aircraft pylon or other aircraft appendage.

A current design practice is to attach the engine inlet to the fan case by a bolted flange. The fan case is covered by fan cowls which are attached to a pylon structure. The fan case is attached by a bolted flange to a fan frame containing bearings to transmit the engine thrust from the fan rotor to the pylon through a conventional mount system attached to the fan frame at the 12:00 position at its outer diameter and/or at the fan frame hub. The core module is attached to the hub of the fan frame by a bolted flange.

A thrust reverser assembly may be attached to a v-groove around the fan frame circumference and sometimes by a v-groove on the fan frame hub circumference. The thrust reverser assembly may be attached to the pylon by hinged lugs that allow movement fore and aft.

The engine is supported at its aft end by a mount that attaches to the pylon. Thrust links are sometimes used to transmit the engine thrust to the pylon structure and thereby reduce bending moments in the structure. Inlet overturning moments are transmitted through the mount system to the pylon.

Most large turbofans are considered ready for installation when the fan and inlet are assembled to the remaining engine components. During engine service, the fan and inlet may remain attached to the engine components, although the turbofan overhaul practices typically involve refurbishment of the core module of the engine with limited need for fan module work. Thus, removal of the fan module during the engine overhaul process leads to wasted shop floor space. The inlet and often the fan module may be removed for engine transport due to cargo aircraft door opening restrictions and roadway obstructions.

During aircraft maneuvers, the nacelle may experience an applied nacelle maneuvering force distributed nonuniformly over the nacelle surface both axially and circumferentially. The applied nacelle maneuvering force can significantly deflect and distort or ovalize the nacelle and/or fan case. Conventionally, as illustrated in FIG. 1, and discussed in greater detail below, this applied nacelle maneuvering force is transmitted around the circumference of the nacelle, from the inlet to the fan case and then through the fan struts to the core case, where it is reacted at the forward and aft mount link sets. The reaction forces tend to bend the cases and cause the adverse effects previously described. Furthermore, all of the forces and torques acting on the engine or nacelle are transferred to the pylon, which is usually includes a substantial structure.

Accordingly, it would be desirable to provide an engine nacelle structure that reduces weight, backbone bending, and required shop floor space.

BRIEF DESCRIPTION OF THE INVENTION

The above-mentioned need or needs may be met by exemplary embodiments which provide an assembly comprising a monolithic structure. The exemplary monolithic structure includes an integral nacelle portion and a support structure portion. The nacelle portion generally comprises a body of rotation about an axial centerline and including an inlet region and a fan case region cooperating to define an annular wall bounding an axial channel. The monolithic structure further includes a ring member disposed in the axial channel. A plurality of radial elements extends from the ring member to the annular wall.

The support structure portion generally extends in an axial direction, and includes a forward section integral with the nacelle portion and having an inlet stiffening region disposed radially outward of the annular wall. The support structure includes an aft section having at least one aircraft mount region. The monolithic structure is attachable to an associated aircraft at the aircraft mount region. When mounted on an associated aircraft, the nacelle portion and the support structure portion cooperate to form a first load path operable to transmit an applied nacelle maneuvering force directly to the associated aircraft.

In an exemplary embodiment, the assembly includes a selectively removable gas turbine engine mounted in supporting connection with the monolithic structure so that an engine centerline is substantially coextensive with the centerline of the nacelle portion. The assembly further includes a first assembly mounting the gas turbine engine to the monolithic structure at the aft section of the support structure portion; and a non-rigid interface between the gas turbine engine and the ring member non-rigidly mounting the gas turbine engine to the ring member, wherein, the gas turbine engine is substantially isolated from being acted on by the applied nacelle maneuvering force, when present.

In an exemplary embodiment, an assembly comprises an aircraft and a monolithic structure mounted in supporting connection with the aircraft. The monolithic structure includes an integral nacelle portion and a support structure portion. The nacelle portion generally comprises a body of rotation about an axial centerline and including an inlet region and a fan case region cooperating to define an annular wall bounding an axial channel. The monolithic structure further includes a ring member disposed in the axial channel. A plurality of radial elements extends from the ring member to the annular wall. The support structure portion generally extends in an axial direction, and includes a forward section integral with the nacelle portion and having an inlet stiffening region disposed radially outward of the annular wall. The support structure includes an aft section having at least one aircraft mount region.

An exemplary embodiment provides a method of mounting an aircraft engine to an associated aircraft. The exemplary method includes providing an integral monolithic structure; mounting a gas turbine engine to the monolithic structure at an aft mount region; and non-rigidly interfacing the gas turbine engine with the monolithic structure at a non-rigid interface between the gas turbine engine and the monolithic structure.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
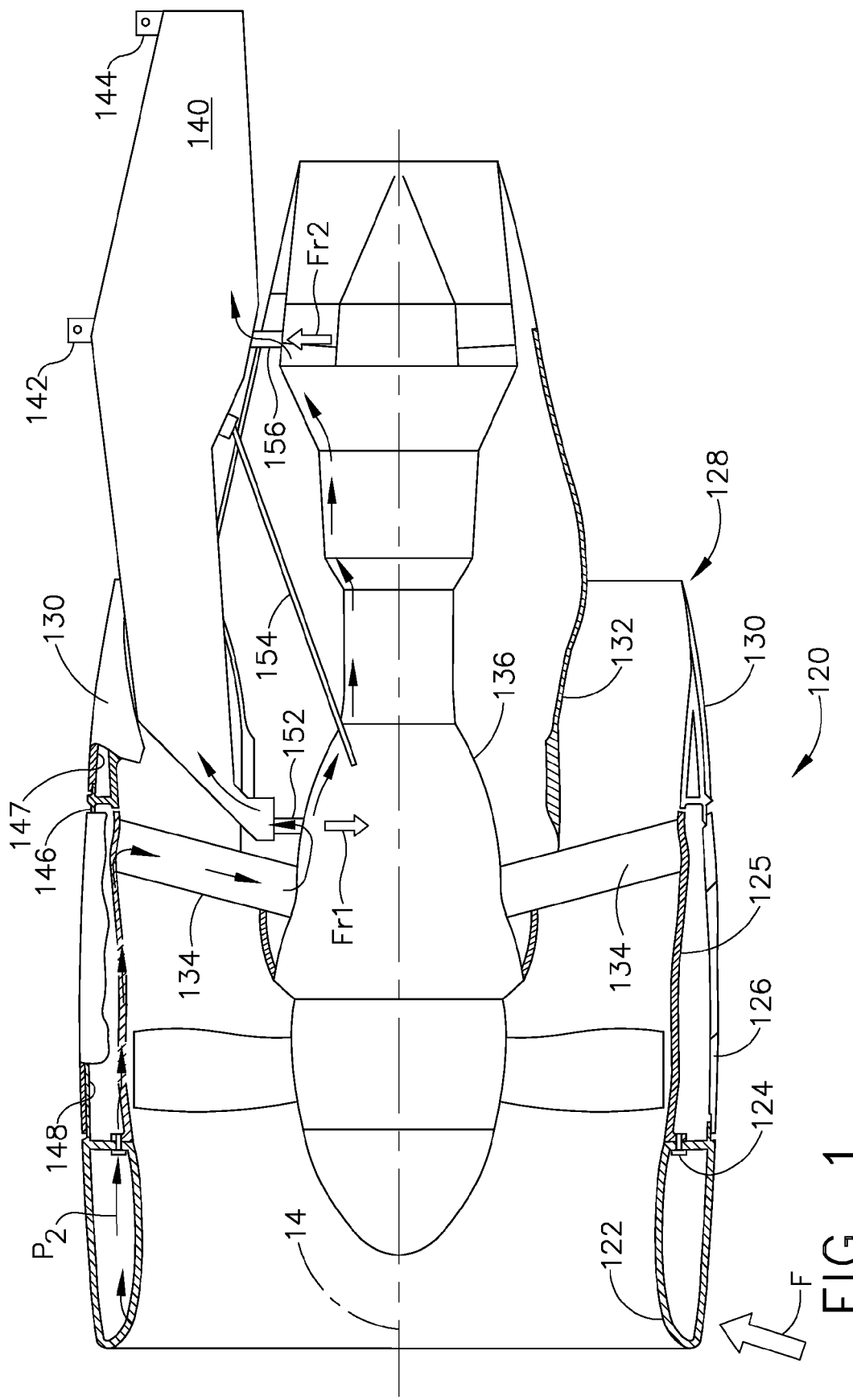
FIG. 1 is a cross section view showing a PRIOR ART nacelle/pylon structure.

FIG. 1 illustrates a typical engine mounting arrangement as known in the art. A nacelle 120 includes an inlet 122 firmly secured, as by a bolted joint 124 to the fan case 125, an intermediate fairing 126 which is a pair of essentially 180° access doors connected by hinges 148 to a forward extension 146 of the pylon 140, and an aft fairing 128 including two essentially 180° fan duct outer walls 130, each connected by hinges 147 to the pylon 140, and an inner core cowl 132. A plurality of fan struts, as represented by struts 134, extend generally radially to connect the fan case 125 to the core case 136. Three sets of mount links 152, 154, 156 connect the engine to the pylon 140 which itself is attached to the aircraft at pylon-to-aircraft mount fittings 142, 144. Forward mount link set 152 is a set of two links that transmit vertical and lateral forces, axial mount link set 154 is a set of two links that transmit axial forces, and aft mount link set 156 is a set of three links located aft of the forward link set to transmit vertical forces, lateral forces and torque.

Figure 2:
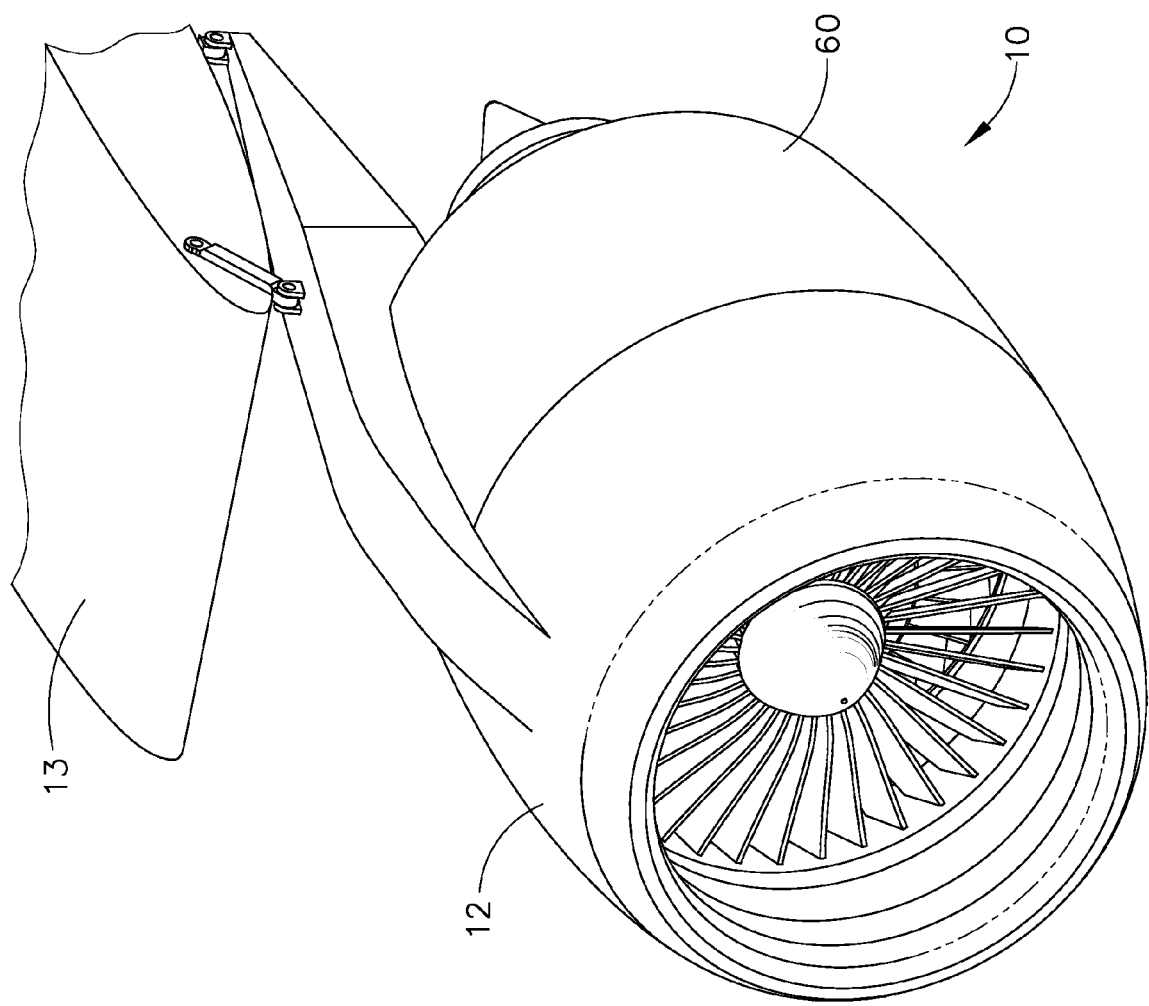
FIG. 2 is a schematic illustration of an exemplary monolithic structure and gas turbine engine assembly mounted to a wing of an associated aircraft.
Figure 3:
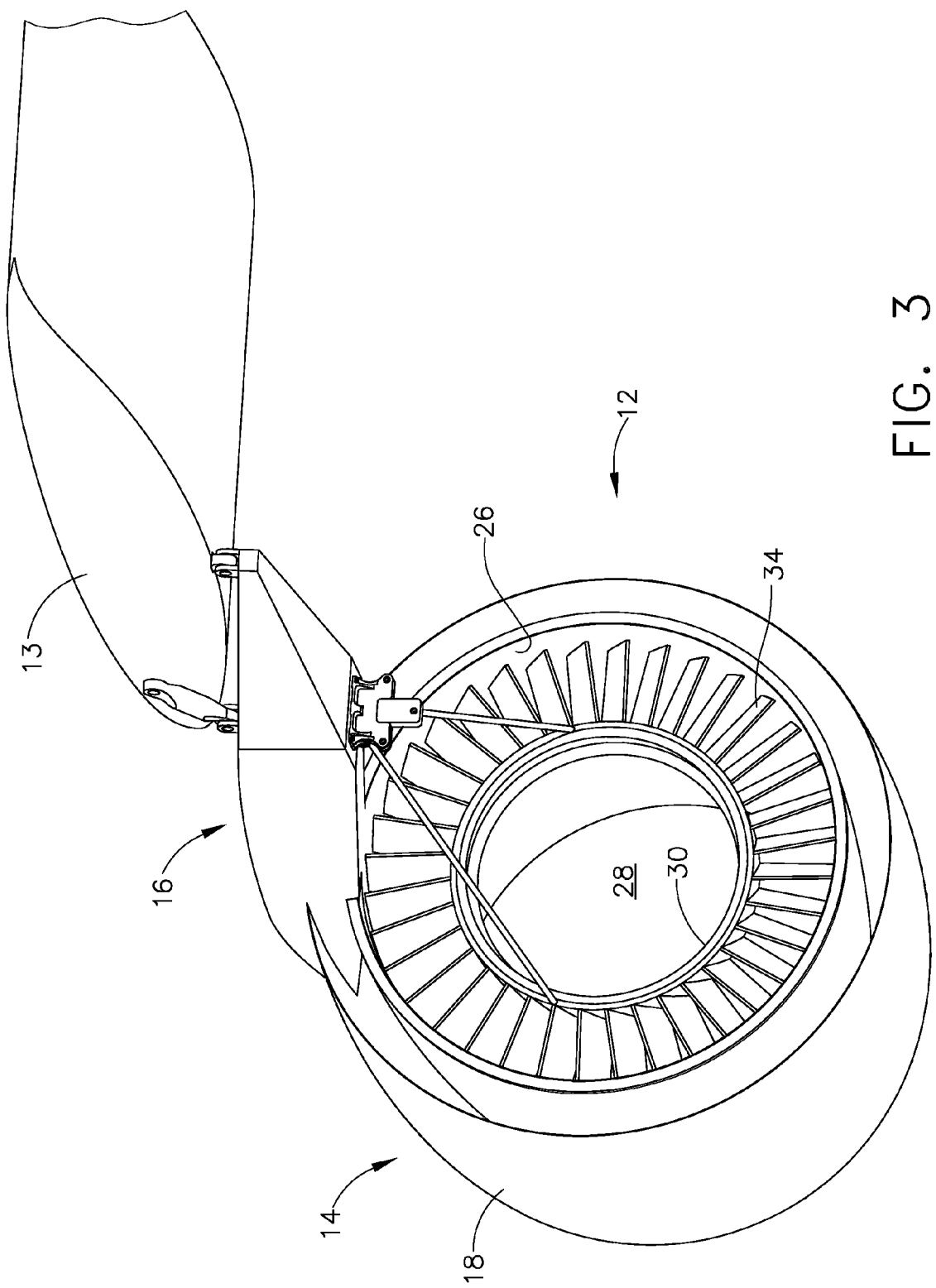
FIG. 3 is an aft-looking forward view of an exemplary monolithic structure mounted to a wing of an associated aircraft.

The above-mentioned needs of weight reduction, reduced backbone bending, and reduced shop floor space may be met by exemplary embodiments described below and shown in the accompanying Figures. FIGS. 2-3 generally show an assembly 10 which includes an integral monolithic structure 12 adapted for direct, semi-permanent attachment to an associated aircraft 13. The terms "integral" and "integrated" used throughout the text of this application and the appended claims are intended to mean items with are integrally joined or manufactured such that disassembly (in a typical non-destructive sense) is not possible. By "semi-permanent" it is meant that for usual repairs, service, and replacement of a gas turbine engine or components thereof, the monolithic structure 12 may be retained in supporting connection with the aircraft, as is explained in greater detail below. In an exemplary embodiment, the monolithic structure includes a nacelle portion 14 and a support structure portion 16. As illustrated in FIG. 2, the assembly 10 may include a thrust reverser assembly 60 as discussed in greater detail below.

Figure 4:
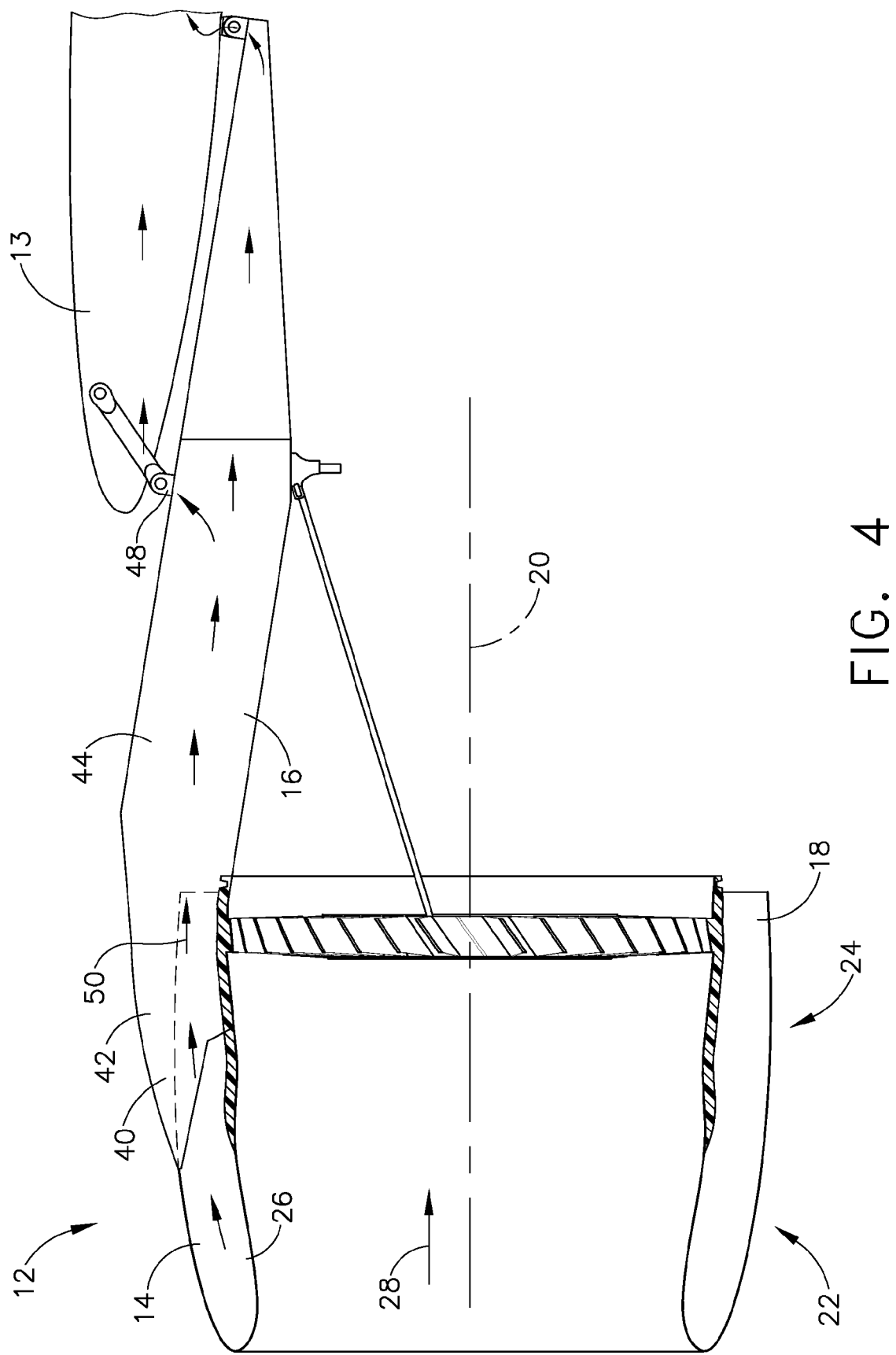
FIG. 4 is a side view, partly in section, of an exemplary monolithic structure.

Referring now to FIGS. 3 and 4, an exemplary nacelle portion 14 generally comprises a body of rotation 18 about an axial centerline 20. The nacelle portion 14 includes an inlet region 22 and a fan case region 24. In an exemplary embodiment, the inlet region 22 and the fan case region 24 are integrally formed and cooperate to define an annular wall 26 bounding an axial channel 28. In an exemplary embodiment, a ring member 30 is disposed within the axial channel 28 and is supported there through a plurality of radial elements 34 extending from the ring member 30 to the annular wall 26. Ring member 30 is dimensioned to receive at least a portion of a gas turbine engine therethrough as detailed below. Radial elements 30 may be configured as flow-directing elements or vanes as will be appreciated by those with skill in the art. In an exemplary embodiment, the annular wall 26, radial elements 34 and ring member 30 are integrally formed or joined as part of the monolithic structure 12. In an exemplary embodiment, the body of rotation 18 is arranged and dimensioned to encircle and encase a fan assembly 38 of a gas turbine engine assembly 70 (FIG. 5).

The monolithic structure 12 further includes an axially extending support structure portion 16 having a forward section 40 integral with the nacelle portion 14. An inlet stiffening region 42 is disposed in the forward section 40 and generally radially outward of the annular wall 26. The inlet stiffening region provides structural support forward of a traditional attachment site for a pylon. In an exemplary embodiment, the inlet stiffening region extends circumferentially up to about 180° about the nacelle portion 14. The inlet stiffening region may, for example, comprise a greater thickness than the remainder of the nacelle portion 14. In other exemplary embodiments, the inlet stiffening region may comprise structural and/or stiffening elements, such as honeycomb structures as is known in the art. Other inlet stiffening means may be contemplated by those having skill in the art.

In an exemplary embodiment, the support structure portion 16 extends aft of the body of rotation 18 and includes one or more aerodynamic surfaces. The support structure portion 16 also includes an aft section 44 defining at least one aircraft mount region 48. When mounted on an aircraft, the nacelle portion 14 and the support structure 16 cooperate to form a first load path, indicated by arrows 50, for distributing static and dynamic loads transmitted between the engine and the airplane. The monolithic structure may be mounted under an aircraft wing as depicted in FIGS. 2-4, or may be attached to any other appropriate point, for example, on top of a wing, or the fuselage, or other appendage of the aircraft.

Figure 5:
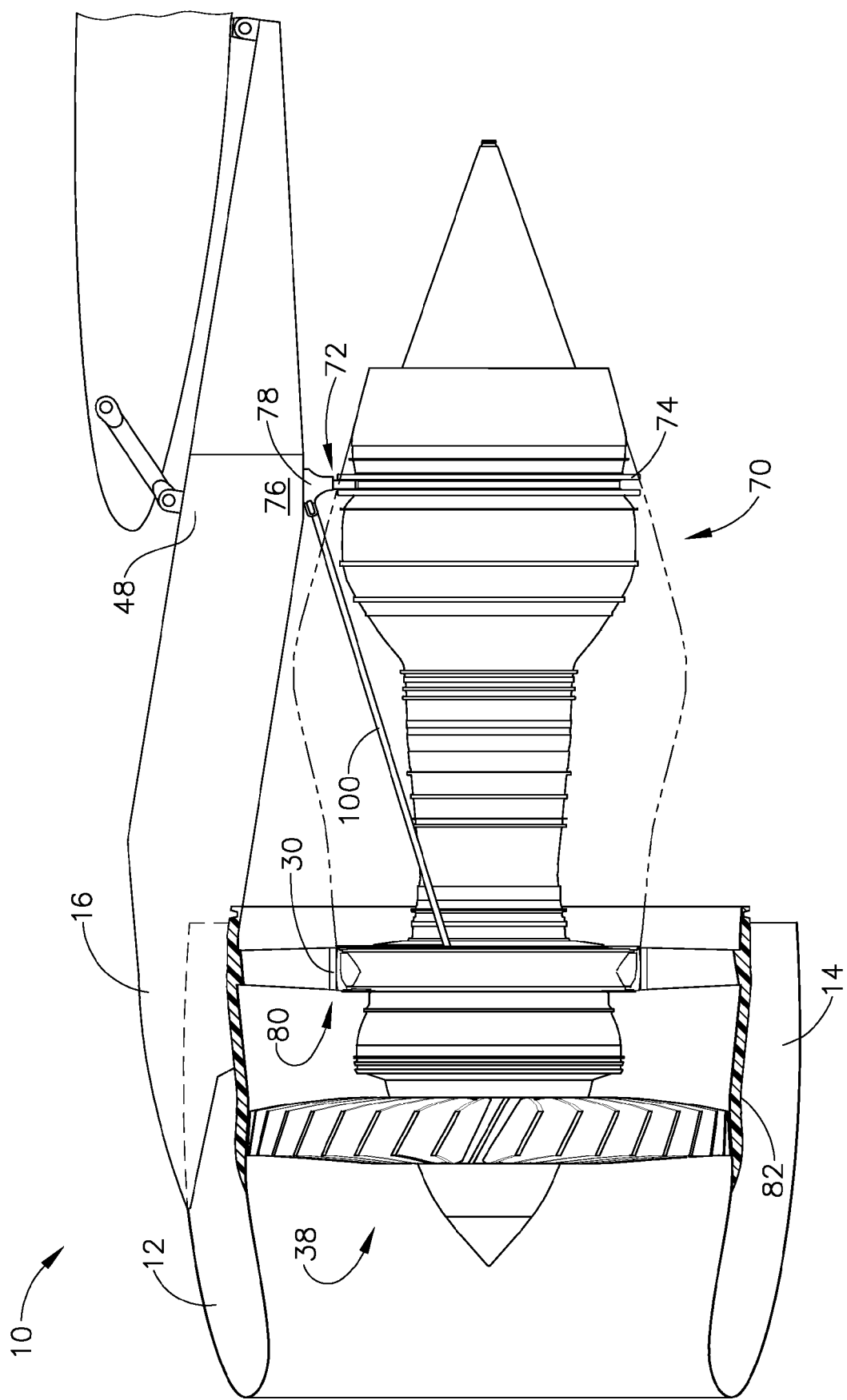
FIG. 5 is a side view, partly in section, of an exemplary embodiment of a monolithic structure and gas turbine engine assembly.

Referring now to FIG. 5, an exemplary assembly 10 includes a gas turbine engine assembly 70 mounted in supported connection with the monolithic structure 12. In an exemplary embodiment, a first mounting assembly 72 mounts the gas turbine engine assembly 70 to the monolithic structure 12 at the aft section 44 of the support structure portion 16 at an engine mount site 76. The first mounting assembly 72 may include a turbine ring 74 and an aft frame hanger 78 as is well known in the art. In an exemplary embodiment, the assembly includes a non-rigid interface 80 between the gas turbine engine assembly 70 and the ring member 30 of the monolithic structure 12. The non-rigid interface substantially isolates the gas turbine engine from being acted on by an applied nacelle maneuvering force that are reacted along the load path 50 as earlier described. In an exemplary embodiment, the non-rigid interface allows axial and circumferential relative movement between the nacelle portion 14 of the monolithic structure and the gas turbine engine assembly. The non-rigid interface may comprise a slip-joint arrangement, a spherical bearing, a link arrangement, a yoke with bearings at the 3 o'clock and 9 o'clock positions, a flexible diaphragm, or other arrangement that reduces transmission of the applied nacelle maneuvering force through the engine core.

Also shown in FIG. 5, in an exemplary embodiment, the monolithic structure 12 includes a containment system 82 at the annular wall 26 for fan blade out events. The monolithic structure may comprise in whole or in part, composite material, which may include reinforced carbon fiber epoxy as is known in the art. In an exemplary embodiment, the containment system is integrally formed at the time of formation of other portions of the monolithic structure. In other exemplary embodiments, the containment system may be substantially formed separate from other portions of the monolithic structure, and then integrally joined thereto.

Figure 6:
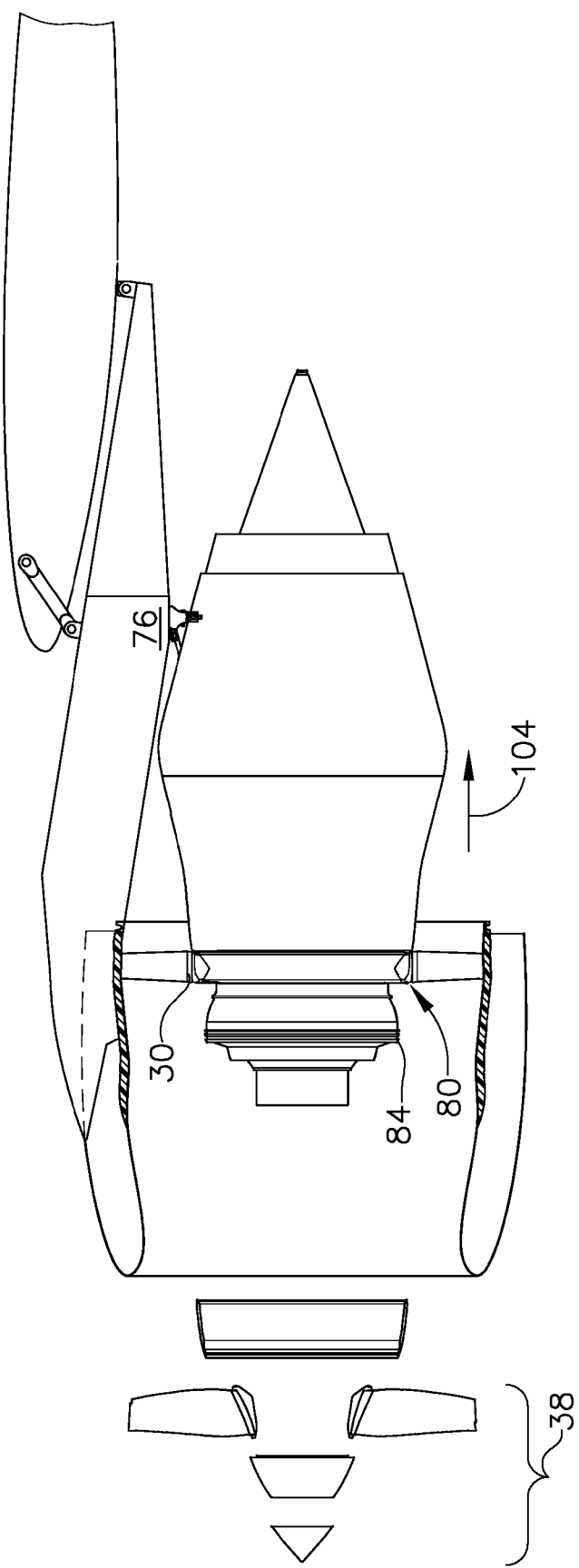
FIG. 6 is a side view, partly in section, of a monolithic structure and gas turbine engine assembly illustrating partial disassembly and removal of a gas turbine engine.

As shown in FIG. 6, in an exemplary embodiment, the ring member 30 of the monolithic structure 12 is arranged and dimensioned for receiving at least a portion of the gas turbine engine therethrough including the compressor inlet 84. In an exemplary embodiment, the fan assembly 38 may be disassembled and removed from the remainder of the gas turbine engine assembly including the engine core. The remainder of the gas turbine engine is configured and dimensioned for rearward removal from the monolithic structure. For example, those with skill in the art will appreciate that various attachments, bolts, and mounting fixtures may be disengaged to allow rearward movement of the remainder of the gas turbine engine.

Figure 7:
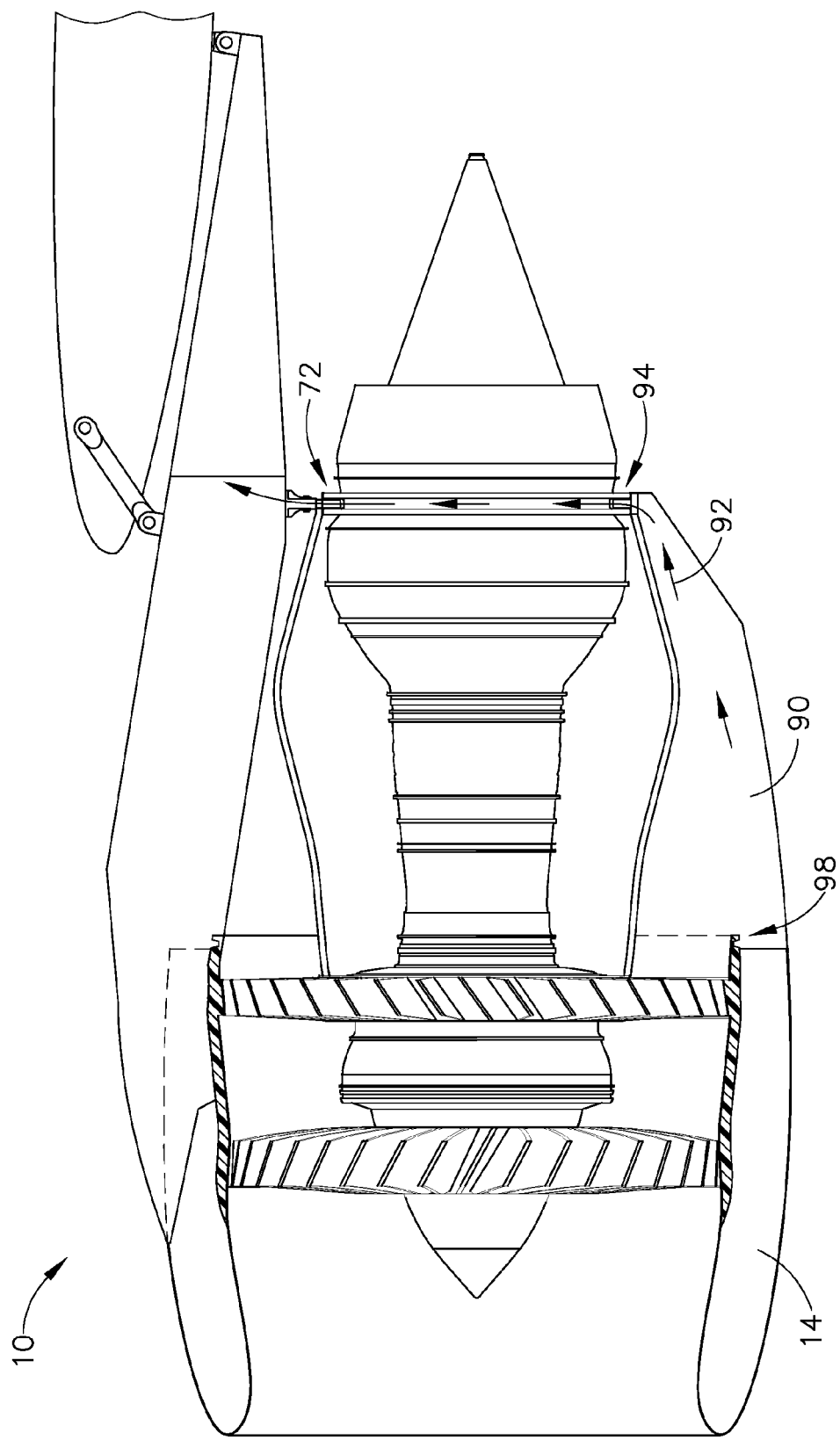
FIG. 7 is a side view, partly in section, of an alternate exemplary embodiment of a monolithic structure and gas turbine engine assembly.
Figure 8:
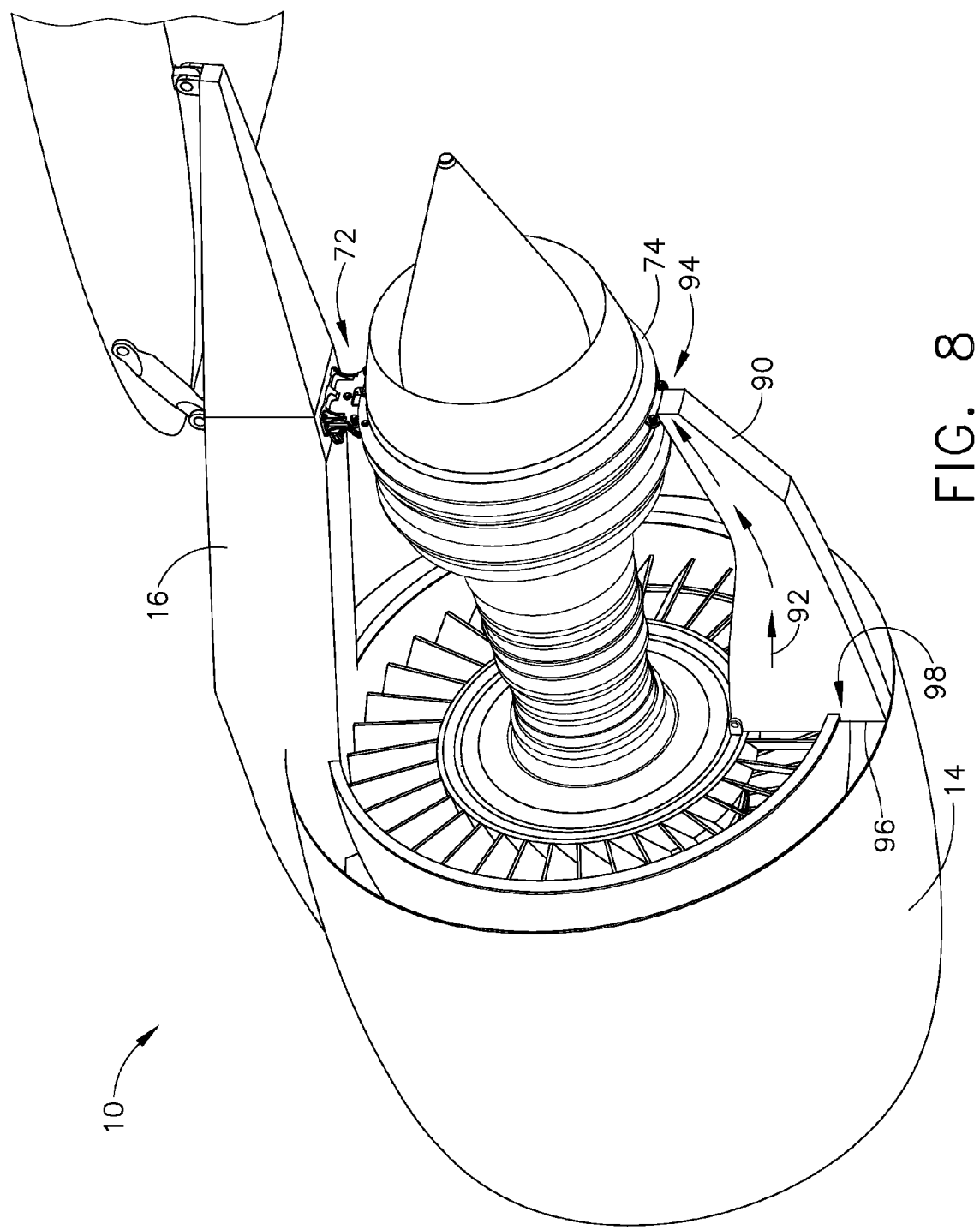
FIG. 8 is an aft-looking forward view of the exemplary embodiment shown in FIG. 7.

FIGS. 7 and 8 are directed to an alternate embodiment of assembly 10. This alternate embodiment includes a lower axially extending support member 90 operationally positionable generally opposite the support structure portion 16. In an exemplary embodiment, the lower support member 90 extends between the nacelle portion 14 turbine ring 74 of the first mounting assembly 72. In an exemplary embodiment, the lower support member is a structural member able to provide at least a portion of a lower load path, designated by arrow 92. The lower load path is able to transmit static and dynamic forces, including at least a portion of an applied nacelle maneuvering force, to the associated aircraft along the lower load path 92. The lower support member 90 may be a unitary member as illustrated in FIG. 7, or alternately, the lower support member 90 may be part of a thrust reverser assembly 60. Those having skill in the art will appreciate that a thrust reverser assembly may comprise a pair of clamshell doors. It is envisioned that the lower support member 90 may be fashioned as mating sidewalls of a thrust reverser assembly. In an exemplary embodiment, at least one load transferring assembly 94, such as a pin-in-slot arrangement or tangential links, is selectively engageable between the gas turbine engine and the thrust reverser assembly. The forward face 96 of the lower support member 90 may be engageable with the monolithic structure through a v-groove/v-blade arrangement 98. In an exemplary embodiment, the thrust reverser assembly 60 may interface with the monolithic structure at a plurality of v-groove/v-blade attachment locations 98 as is well known in the art.

Referring again to FIG. 5, the structural arrangements disclosed herein provide transmission of the inlet lift load or applied nacelle maneuvering forces directly to the support structure portion 16 instead of through the engine carcass. In an exemplary embodiment, engine thrust loads are carried through thrust links 100 attached at the engine mount site 76 and at the ring member 30 of the monolithic structure 12 with a line of action that intersects the centerline of the engine at the plane of the fan.

In accordance with an exemplary embodiment, there is provided a method of mounting an aircraft engine to an associated aircraft. An exemplary method includes providing an integral monolithic structure that includes a body of rotation 18 about a centerline. The body of rotation 18 is dimensioned to circumscribe at least a fan assembly 38 of a gas turbine engine assembly 70. The gas turbine engine assembly 70 is mounted to the monolithic structure at an aft engine mount site 76. In an exemplary embodiment, the engine mount site is located aft of the nacelle portion 14. The gas turbine engine assembly interfaces with the monolithic structure at a non-rigid interface 80. The monolithic structure 12 is attached to the associated aircraft at an aircraft mount region 48.

As illustrated in FIG. 6, in an exemplary embodiment, the engine assembly 70 is removed from the associated aircraft 13 by removing fan assembly 38, detaching the engine assembly from engine mount site 76, and disengagement at the non-rigid interface 80. The remainder of the engine assembly may thus be displaced rearwardly from the monolithic structure 12, as indicated by arrow 104.

Exemplary embodiments disclosed herein reduce backbone bending caused by reaction of applied maneuvering forces along the core engine to a pylon. The exemplary monolithic structure provides a flow path external to the core engine. Sufficient stiffening of the inlet and, in certain embodiments, an axially extending lower support structure reduce ovalization of the nacelle region, thus maintaining tip clearances between the fan blades and the annular wall to improve engine efficiency. Each exemplary embodiment disclosed herein may include certain features detailed in descriptions of other exemplary embodiments within the scope of the present invention.

This written description uses exemplary embodiments to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An assembly comprising:
   an integral monolithic structure including:
   a nacelle portion generally comprising a body of rotation about an axial centerline and including an inlet region and a fan case region cooperating to define an annular wall bounding an axial channel;
   a ring member disposed in the axial channel;
   a plurality of radial elements extending from the ring member to the annular wall; and
   a support structure portion generally extending in an axial direction, wherein the support structure portion includes a forward section integral with the nacelle portion and having an inlet stiffening region radially outward of the annular wall, and an aft section including at least one aircraft mount region, wherein the monolithic structure is attachable to an associated aircraft at the aircraft mount region;
   a selectively removable gas turbine engine with a casing being mounted in supporting connection with the monolithic structure and wherein at least a portion of the gas turbine engine extends through the ring member; and
   a non-rigid interface between the gas turbine engine and the ring member;
   wherein, when mounted on the associated aircraft, the nacelle portion and the support structure portion cooperate to form a first load path operable to transmit an applied nacelle maneuvering force directly to the associated aircraft and when the applied nacelle maneuvering force is present, the gas turbine engine is substantially isolated from being acted on by the applied nacelle maneuvering force.

2. The assembly according to claim 1, further comprising a first assembly mounting the gas turbine engine to the monolithic structure at the aft section of the support structure portion.

3. The assembly according to claim 2 including a lower axially extending support member operationally positionable generally opposite the support structure portion and extending between the nacelle portion and the first assembly, wherein the lower axially extending support member provides at least a portion of a lower load path able to transmit at least a portion of the applied nacelle maneuvering force to the associated aircraft along the lower load path.

4. The assembly according to claim 3 wherein the lower axially extending support member comprises at least a portion of a thrust reverser assembly mounted in supporting connection with the monolithic structure.

5. The assembly according to claim 2, further comprising:
a thrust reverser assembly being mounted in supporting connection with the monolithic structure.

6. The assembly according to claim 5, further comprising:
at least one load transferring assembly selectively engageable between the gas turbine engine and the thrust reverser assembly, wherein the at least one load transferring assembly and the thrust reverser assembly cooperate to define a lower load path for directing a load applied to the gas turbine engine to the support structure portion of the monolithic structure.

7. The assembly according to claim 2 wherein the gas turbine engine includes a fan assembly and an engine core, wherein the fan assembly is capable of disassembly while the engine core is mounted in supporting connection to the monolithic structure.

8. The assembly according to claim 7 wherein the section of the gas turbine engine extending through the ring member is capable of aft axial displacement.

9. The assembly according to claim 1 wherein the monolithic structure is predominately formed from composite material including fiber reinforced epoxy.

10. The assembly according to claim 1 wherein the inlet stiffening region extends circumferentially up to about 180°.

11. The assembly according to claim 1, further comprising a fan blade containment region forming at least a part of the annular wall.

12. The assembly according to claim 1 wherein at least one radial member comprises a flow directing vane.

13. The assembly according to claim 1, wherein the gas turbine engine has an engine centerline substantially coextensive with the centerline of the nacelle portion.

14. The assembly according to claim 1, wherein the non-rigid interface is a slip-joint arrangement, a spherical bearing, a link arrangement, a yoke with bearings or a flexible diaphragm.

15. An assembly comprising:
an aircraft; and
an integral monolithic structure mounted in supporting connection with the aircraft, wherein the monolithic structure includes:
a nacelle portion generally comprising a body of rotation about an axial centerline and including an inlet region and a fan case region cooperating to define an annular wall bounding an axial channel, wherein the fan case region includes a ring member disposed in the axial channel and a plurality of radial elements extending from the ring member to the annular wall; and
a support structure portion generally extending in an axial direction, wherein the support structure portion includes a forward section integral with the nacelle portion and having an inlet stiffening region radially outward of the annular wall, and an aft section including at least one aircraft mount region, wherein the monolithic structure is mounted in supporting connection to the aircraft at the aircraft mount region;
wherein the nacelle portion is dimensioned to at least partially circumscribe a fan assembly of a gas turbine engine having a casing and being mounted in supporting connection with the monolithic structure and wherein at least a portion of the gas turbine engine extends through the ring member with a non-rigid interface between the gas turbine engine and the ring member.

16. A method of mounting an aircraft gas turbine engine having a casing to an associated aircraft, the method including:
providing an integral monolithic structure including a body of rotation about a centerline and including an inlet region and a fan case region cooperating to define an annular wall bounding an axial channel and a ring member being dimensioned to circumscribe at least a fan assembly of the gas turbine engine, and a plurality of radial elements extending from the ring member to the annual wall;
attaching the monolithic structure to the associated aircraft;
mounting the gas turbine engine having the casing to the monolithic structure at an aft mount region; and
non-rigidly interfacing the gas turbine engine with the ring member of the monolithic structure at a non-rigid interface between the gas turbine engine and the ring member of the monolithic structure.

* * * * *

UNITED STATES PATENT AND TRADEMARK OFFICE
CERTIFICATE OF CORRECTION

PATENT NO. : 8,469,309 B2  
APPLICATION NO. : 12/343833  
DATED : June 25, 2013  
INVENTOR(S) : Alan Roy Stuart et al.

Page 1 of 1

It is certified that error appears in the above-identified patent and that said Letters Patent is hereby corrected as shown below:

In the Claims:

Claim 16, Col. 8, lines 33-51: "A method of mounting an aircraft gas turbine engine having a casing to an associated aircraft, the method including: providing an integral monolithic structure including a body of rotation about a centerline and including an inlet region and a fan case region cooperating to define an annular wall bounding an axial channel and a ring member being dimensioned to circumscribe at least a fan assembly of the gas turbine engine, and a plurality of radial elements extending from the ring member to the annular wall; attaching the monolithic structure to the associated aircraft; mounting the gas turbine engine having the casing to the monolitic structure at an aft mount region; and non-rigidly interfacing the gas turbine engine with the ring member of the monolithic structure at a non-rigid interface between the gas turbine engine and the ring member of the monolithic structure." - should be Claim 16 -- A method of mounting an aircraft gas turbine engine having a casing to an associated aircraft, the method including: providing an integral monolithic structure including a body of rotation about a centerline and including an inlet region and a fan case region cooperating to define an annular wall bounding an axial channel and a ring member disposed in the axial channel and being dimensioned to circumscribe at least a fan assembly of the gas turbine engine, and a plurality of radial elements extending from the ring member to the annular wall; attaching the monolithic structure to the associated aircraft; mounting the gas turbine engine having the casing to the monolitic structure at an aft mount region; and non-rigidly interfacing the gas turbine engine with the ring member of the monolithic structure at a non-rigid interface between the gas turbine engine and the ring member of the monolithic structure. --

Signed and Sealed this  
Twenty-ninth Day of October, 2013

Teresa Stanek Rea  
*Deputy Director of the United States Patent and Trademark Office*